(12) United States Patent
Chen

(10) Patent No.: US 7,268,501 B1
(45) Date of Patent: Sep. 11, 2007

(54) MULTI-LAMP DRIVING CIRCUIT

(75) Inventor: Ming-Hsiang Chen, Sindian (TW)

(73) Assignee: Darfon Electronics Corp., Taoyuan (TW)

( * ) Notice: Subject to any disclaimer, the term of this patent is extended or adjusted under 35 U.S.C. 154(b) by 0 days.

(21) Appl. No.: 11/546,406

(22) Filed: Oct. 12, 2006

(30) Foreign Application Priority Data

Jul. 12, 2006 (TW) .............................. 95125543 A

(51) Int. Cl.
H05B 37/02 (2006.01)

(52) U.S. Cl. ..................................... 315/291; 315/224

(58) Field of Classification Search ............. 315/291, 315/307, 224, 311, 312, 310
See application file for complete search history.

(56) References Cited

U.S. PATENT DOCUMENTS 6,420,839 B1 * 7/2002 Chiang et al. .............. 315/311
6,534,934 B1 * 3/2003 Lin et al. .................... 315/312
6,680,588 B2 * 1/2004 Park et al. ................... 315/312
6,922,023 B2 * 7/2005 Hsu et al. .................... 315/291

* cited by examiner

Primary Examiner—Shih-Chao Chen
Assistant Examiner—Minh Dieu A
(74) Attorney, Agent, or Firm—Rabin & Berdo, P.C.

(57) ABSTRACT

A multi-lamp driving circuit includes a transformer, a first lamp, a second lamp, a current/voltage converting circuit and a voltage/current converting circuit. Transformer includes a secondary coil having a first output terminal and a second output terminal. Each of the first lamp and the second lamp has one end coupled to the first output terminal. The current/voltage converting circuit is for outputting a voltage according to a first current of the first lamp. The voltage/current converting circuit is for correspondingly generating a second current according to the voltage, wherein the second current is substantially equal to current of the second lamp.

24 Claims, 16 Drawing Sheets

20(1) Multi-lamp driving circuit

10 Conventional multi-lamp driving circuit

MULTI-LAMP DRIVING CIRCUIT

This application claims the benefit of Taiwan application Serial No. 95125543, filed Jul. 12, 2006, the subject matter of which is incorporated herein by reference.

BACKGROUND OF THE INVENTION

1. Field of the Invention

The invention relates in general to a driving circuit, and more particularly to a multi-lamp driving circuit which generates equal current in each lamp of the backlight module.

2. Description of the Related Art

Referring to FIG. 1, a schematic diagram of a conventional multi-lamp driving circuit is shown. A conventional multi-lamp driving circuit 10 includes at least a main transformer 110, a balance transformer 120, and lamps L(1) and L(2). The main transformer 110 has a secondary coil coupled to one end of the lamp L(1) and one end of the lamp L(2). Each of the lamps L(1) and L(2) has the other end coupled to the balance transformer 120. The balance transformer 120 has the same winding number in the primary and secondary coils, which are opposite in polarity.

When current of the lamps L(1) and L(2) is different, the primary and secondary coils of the balance transformer can respectively induce voltages of opposite polarity. Owing that the induced voltages have the same amount and opposite polarity, the current of the lamps L(1) and L(2) is approximately the same.

However, due to overlarge volume of the balance transformer, the available area of the printed circuit board (PCB) is reduced and the difficulty of circuit layout is increased. Besides, due to high cost of the balance transformer and requirement of one balance transformer for per two lamps, the production cost for a lamp driving circuit is increased along with the number of lamps.

SUMMARY OF THE INVENTION

It is therefore an object of the invention to provide a multi-lamp driving circuit. The multi-lamp circuit has a current/voltage converting circuit for balancing lamp current. Owing that the current/voltage converting circuit is composed of cheap resistors, diodes and transistors, which can be integrated in a chip through a semiconductor process, not only the production cost of the driving circuit can be reduced, but also the PCB available area can be improved.

The invention achieves the above-identified object by providing a multi-lamp driving circuit including a transformer, a first lamp, a second lamp, a current/voltage converting circuit and a voltage/current converting circuit. Transformer includes a secondary coil having a first output terminal and a second output terminal. Each of the first lamp and the second lamp has one end coupled to the first output terminal. The current/voltage converting circuit is for outputting a voltage according to a first current of the first lamp. The voltage/current converting circuit is for correspondingly generating a second current according to the voltage, wherein the second current is substantially equal to current of the second lamp.

The invention achieves the above-identified object by providing a multi-lamp driving circuit including a transformer, a first lamp, a second lamp, a first current/voltage converting circuit, a second current/voltage converting circuit, a first voltage/current converting circuit and a second voltage/current converting circuit. The transformer includes a secondary coil having a first output terminal and a second output terminal. One end of the first lamp is coupled to the first output terminal via the first current/voltage converting circuit, and the other end of the first lamp is coupled to the second output terminal via the second current/voltage converting circuit. One end of the second lamp is coupled to the first output terminal via the first voltage/current converting circuit, and the other end of the second lamp is coupled to the second output terminal via the second voltage/current converting circuit. Each of the first current/voltage converting circuit and the second current/voltage converting circuit outputs a voltage according to a first current of the first lamp, each of the first voltage/current converting circuit and the second voltage/current converting circuit correspondingly generates a second current according to the voltage, and the second current is substantially equal to the current of the second lamp.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
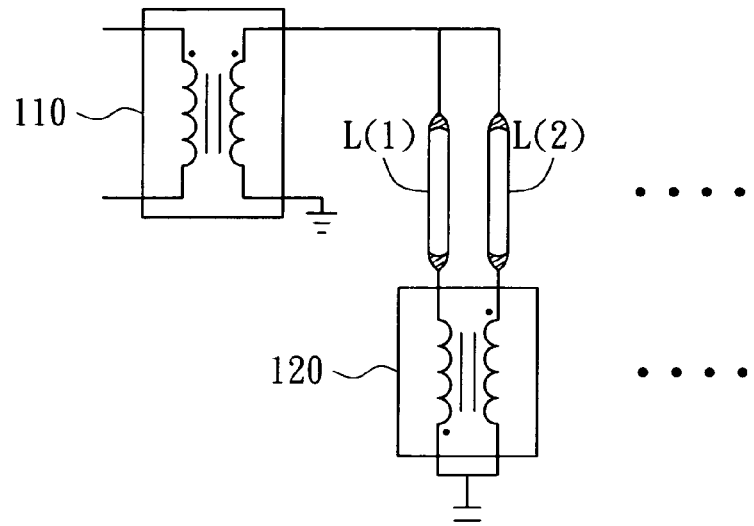
FIG. 1 (Prior Art) is a schematic diagram of a conventional multi-lamp driving circuit.
Figure 2:
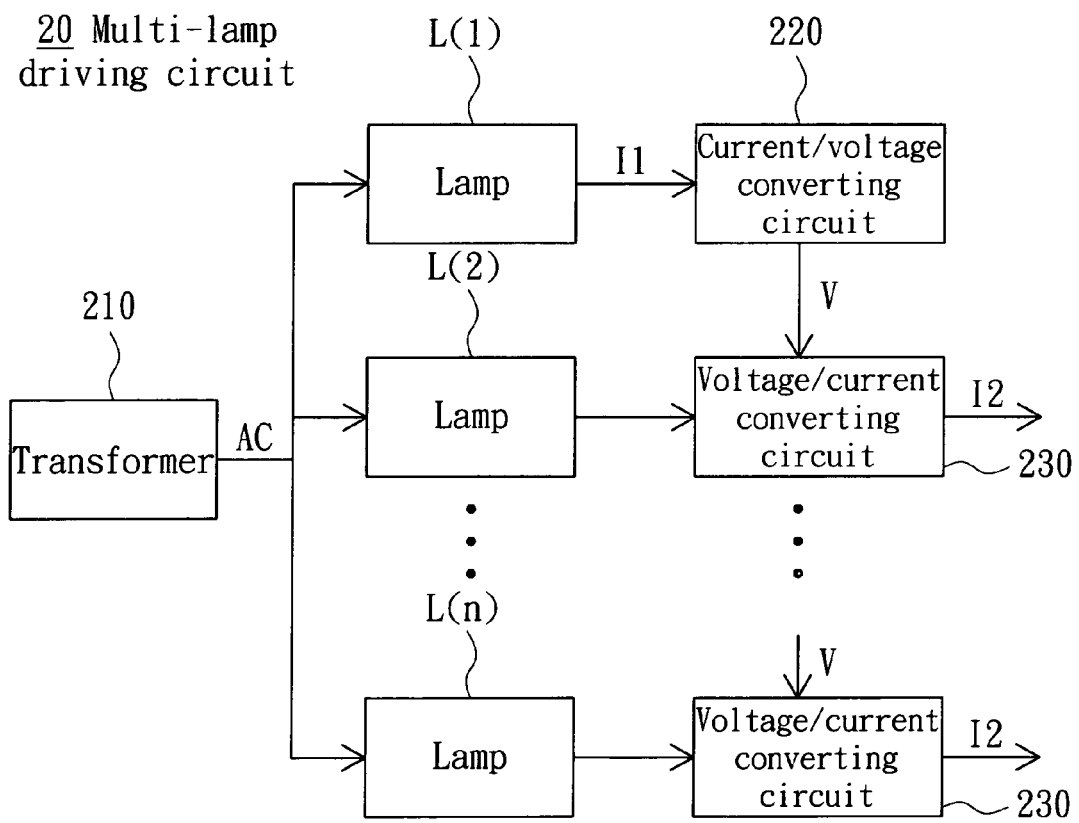
FIG. 2 is a block diagram of a multi-lamp driving circuit according to the invention.

Referring to FIG. 2, a block diagram of a multi-lamp driving circuit according to the invention is shown. A multi-lamp driving circuit 20, for example, applied to a backlight module, includes at least a transformer 210, a current/voltage converting circuit 220, a voltage/current converting circuit 230 and lamps L(1)~L(n), wherein n is a positive integer.

The transformer 210 is for outputting an alternating-current (AC) voltage AC to drive the lamps L(1)~L(n). The current/voltage converting circuit 220 is for outputting a voltage V according to current I1 of the lamp L(1), and the voltage/current converting circuit 230 is for correspondingly generating current I2 according to the voltage V, wherein the current I2 is substantially equal to the current of the lamps L(2)~L(n).

Because the current of the lamps L(2)~L(n) is adjusted on the basis of the current I1, impedance of the lamp L(1) is larger than impedance of the lamps L(2)~L(n) preferably.

The above-mentioned current/voltage converting circuit 220 and the voltage/current converting circuit 230 are composed of cheap resistors, diodes and transistors for reducing production cost of the driving circuit. Besides, the resistors, diodes and transistors of the current/voltage converting circuit 220 and the voltage/current converting circuit 230 can be integrated in a chip through a semiconductor process. Therefore, not only the production cost can be reduced, but also the PCB available area can be improved.

Example One

Figure 3:
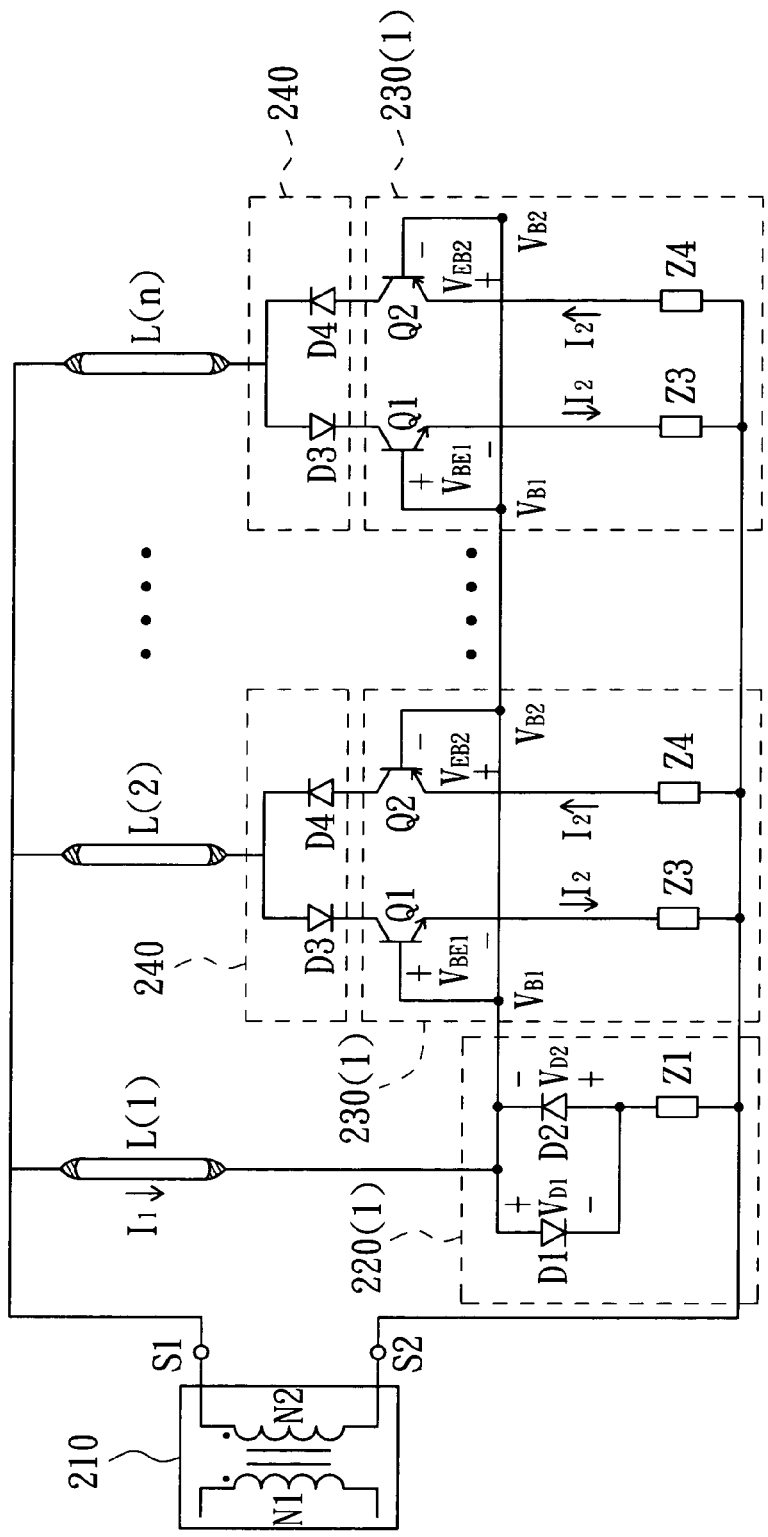
FIG. 3 is a circuit diagram of the first kind of multi-lamp driving circuit according to the first embodiment of the invention.

Referring to FIG. 3, a circuit diagram of the first kind of multi-lamp driving circuit according to the first embodiment of the invention is shown. A multi-lamp driving circuit 20(1) includes a transformer 210, a current/voltage converting circuit 220(1), a voltage/current converting circuit 230(1), a diode circuit 240 and lamps L(1)~L(n).

The transformer 210 has a primary coil N1 and a secondary coil N2, and the secondary coil N2 has output terminals S1 and S2. Each of the lamps L(1)~L(n) has a first end coupled to the output terminal S1, the lamp L(1) has a second end coupled to the output terminal S2 via the current/voltage converting circuit 220(1), and each of the lamps L(2)~L(n) is coupled to the output terminal S2 via the voltage/current converting circuit 230(1) and the diode circuit 240.

The current/voltage circuit 220(1) includes diodes D1 and D2 and impedance Z1, such as a resistor. A positive end of the diode D1 and a negative end of the diode D2 are coupled to the second end of the lamp L(1), a negative end of the diode D1 and a positive end of the diode D2 are coupled to a first end of the impedance Z1, and a second end of the impedance Z1 and the output terminal S2 are coupled to a ground voltage. The negative end of the diode D2 and positive end of the diode D2 can be coupled to a feedback circuit so as to stabilize the current I1 of the lamp L(1).

The diode circuit 240 includes diodes D3 and D4, and a positive end of the diode D3 and a negative end of the diode D4 are coupled to the second ends of the lamps L(2)~L(n).

The diode circuit 240 is coupled to the output terminal S2 via the voltage/current converting circuit 230(1). The voltage/current converting circuit 230(1) includes transistors Q1 and Q2, and impedance Z3 and Z4, wherein the impedance Z3 and Z4 is substantially the same.

The transistors Q1 and Q2 are bipolar junction transistors (BJT) for instance. The transistor Q1 can be a NPN transistor and the transistor Q2 can be a PNP transistor. The bases (B) of the transistors Q1 and Q2 are coupled to the positive end of the diode D1 and the negative end of the diode D2. The collector (C) of the transistor Q1 is coupled to the negative end of the diode D3 while the collector of the transistor Q2 is coupled to the positive end of the diode D4. The emitters (E) of the transistors Q1 and Q4 are respectively coupled to the first ends of the impedance Z3 and Z4. The impedance Z3 and Z4 is, such as, a resistor, and the second ends of the impedance Z3 and Z4 are coupled to the output terminal S2.

Owing that the impedance Z1, Z3 and Z4 is substantially the same and the forward bias voltages $V_{D1}$ and $V_{D2}$ of the diodes D1 and D2 are substantially equal to the base-to-emitter voltages $V_{BE1}$ and $V_{BE2}$ of the transistors Q1 and Q2, the current of the lamps L(1)~L(n) is substantially the same.

Figure 4:
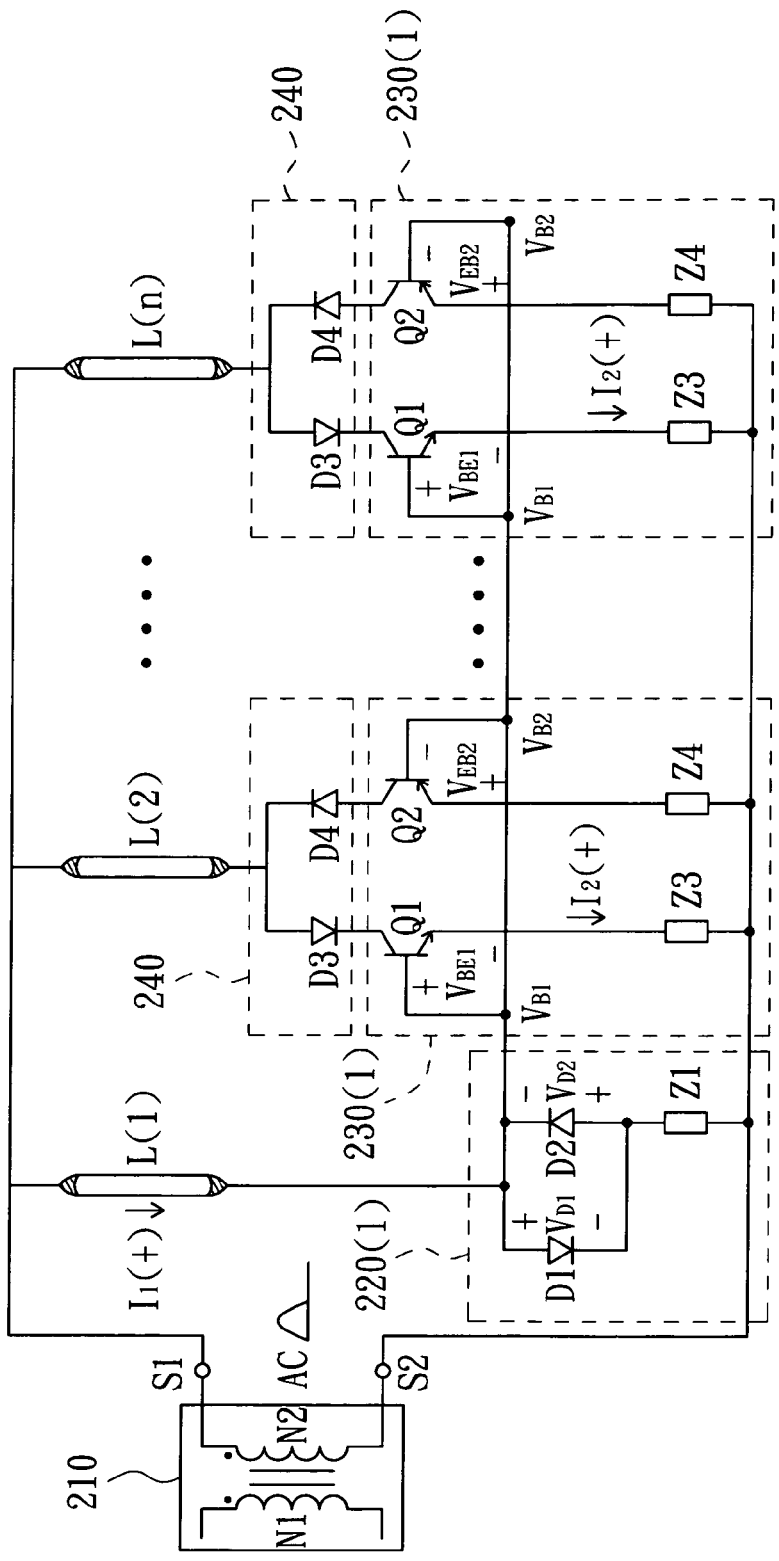
FIG. 4 is a schematic diagram of an AC voltage in a positive half period.

Referring to FIG. 4, a schematic diagram of an AC voltage in a positive half period is shown. For example, when the transformer 210 outputs an AC voltage in a positive half period, the transistor Q1 is turned on and the current I1(+) flows by the lamp L(1), and flows to the impedance Z1 via the diode D1. The transistor Q1 has the base voltage $V_{B1}=V_{D1}+I1(+)\times Z1=V_{BE1}+I2(+)\times Z3$, and the voltage drop $V_{D1}$ of the diode D1 is substantially equal to the base-to-emitter voltage $V_{BE1}$ of the transistor Q1, so the current I2(+) is substantially equal to the current I1(+) of the lamp L(1). In other words, no matter how the current I1(+) would be changed, the current I2(+) is the same as the current I1(+). Therefore, even if the lamps L(1)~L(n) may be different in characteristics, the current of the lamps L(1)~L(n) can be maintained in balance, thereby evening luminance distribution of the backlight module.

Figure 5:
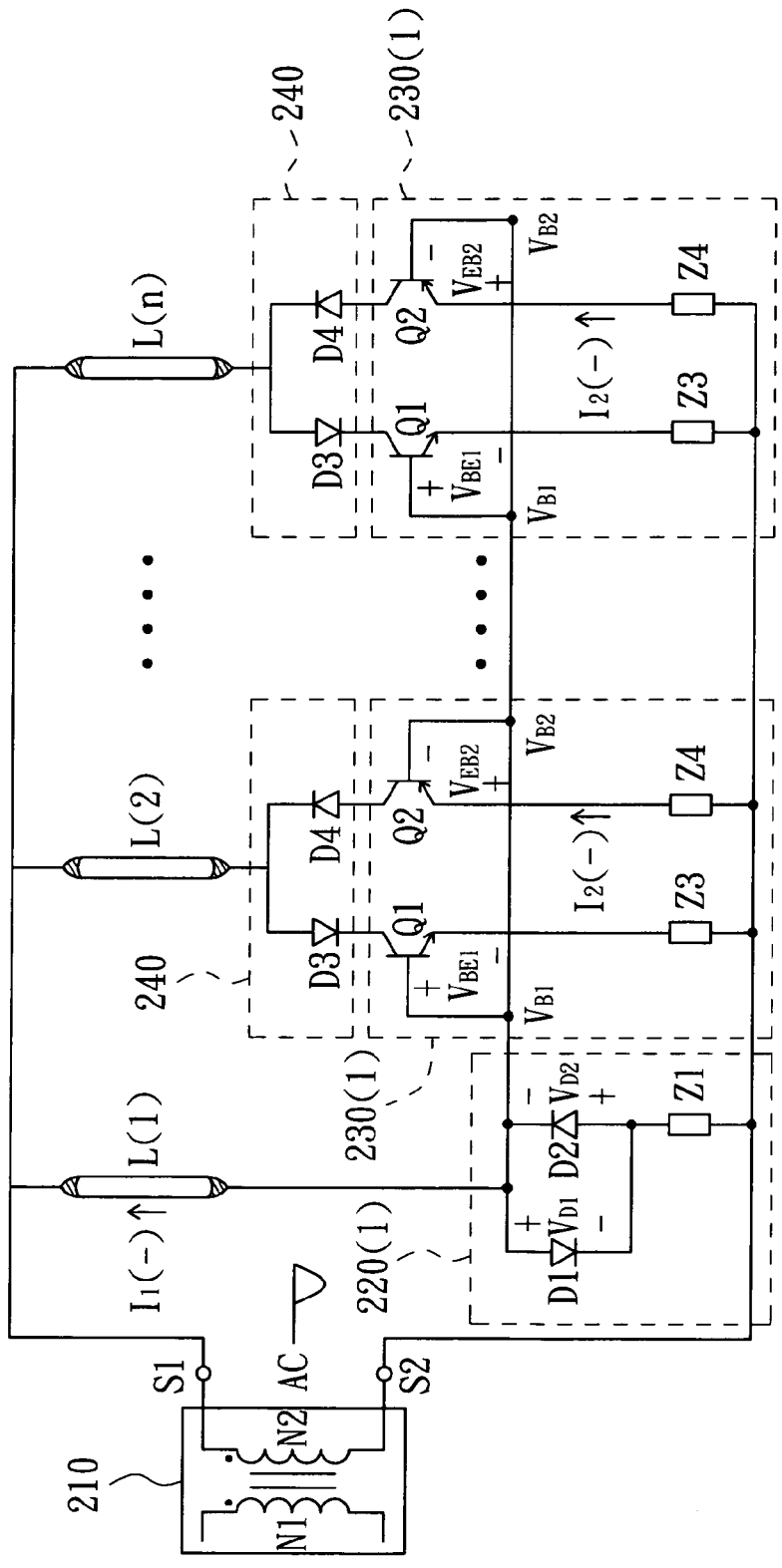
FIG. 5 is a schematic diagram of the AC voltage in a negative half period.

Referring to FIG. 5, a schematic diagram of the AC voltage in a negative half period is shown. Conversely, when the transformer 210 outputs the AC voltage in a negative half period, the transistor Q2 is turned on and the current I1(−) flows by the impedance Z1, and flows to the lamp L(1) via the diode D2. The transistor Q2 has the base voltage $V_{B2}=V_{B1}=V_{D2}+I1(-)\times Z1=V_{EB2}+I2(-)\times Z3$, and the voltage drop $V_{D2}$ of the diode D2 is substantially equal to the base-to-emitter voltage $V_{EB2}$ of the transistor Q2, so the current I2(−) is substantially equal to the current I1(1) of the lamp L(1). In other words, no matter how the current I1(−) would be changed, the current I2(−) is the same as the current I1(−). Therefore, even if the lamps L(1)~L(n) may be different in characteristics, the current of the lamps L(1)~L(n) can be maintained in balance, thereby evening luminance distribution of the backlight module.

Therefore, no matter the transformer 210 outputs the AC voltage in the positive half period or negative half period, the current of each lamp is substantially the same and a good current balance effect can be provided.

Figure 6:
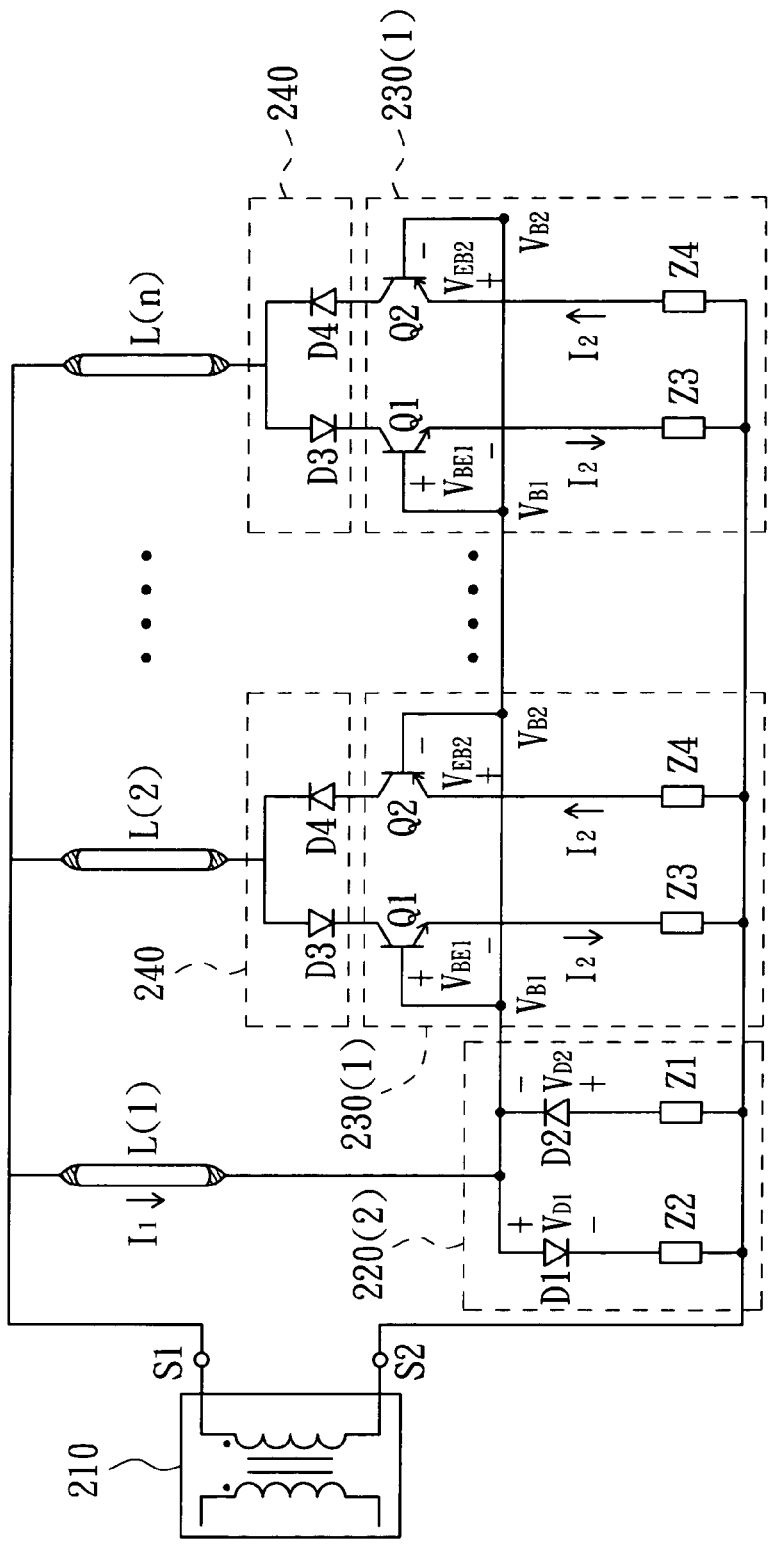
FIG. 6 is a circuit diagram of the second kind of multi-lamp driving circuit according to the first embodiment of the invention.

Referring to FIG. 6, a circuit diagram of the second kind of multi-lamp driving circuit according to the first embodiment of the invention is shown. A multi-lamp driving circuit 20(2) is different from the multi-lamp driving circuit 20(1) in the current/voltage converting circuit 220(2). The current/voltage converting circuit 220(2) includes diodes D1 and D2, and impedance Z1 and Z2, wherein the impedance Z1 and Z2 is substantially the same. The positive end of the diode D1 and negative end of the diode D2 are still coupled to the second end of the lamp L(1), but the negative end of the diode D1 and positive end of the diode D2 are respectively coupled to the first ends of the impedance Z1 and 72, and the second ends of the impedance Z1 and Z2 and output terminal S2 are coupled to a ground voltage.

Because the diodes D1 and D2 are respectively coupled in series to the impedance Z1 and Z2, when the current of the lamps L(1)~L(n) is different in the positive and negative half periods, the current waveform can be improved to be equal in the positive and negative half periods by slightly adjusting the impedance Z1 and Z2.

Figure 7:
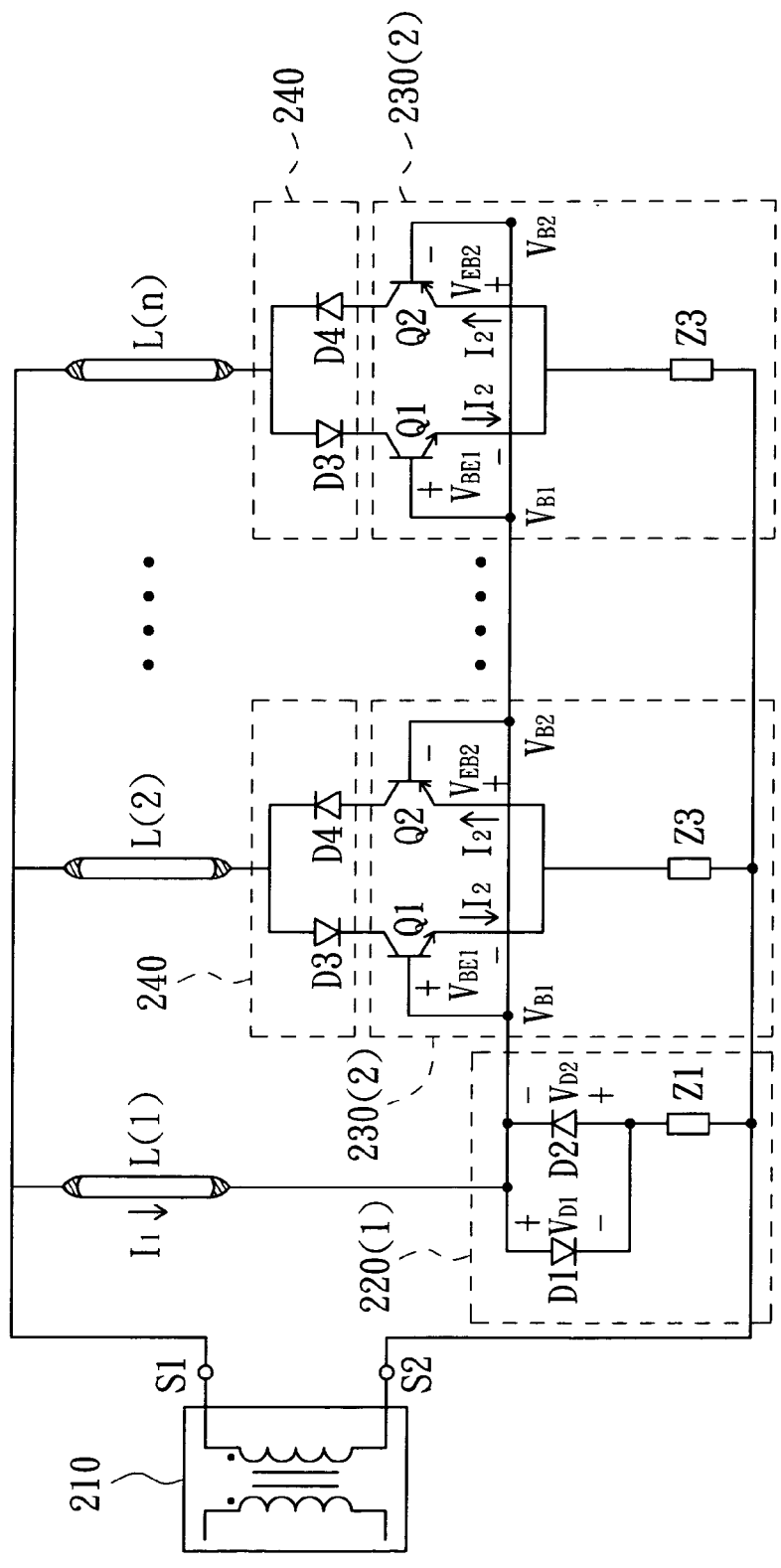
FIG. 7 is a circuit diagram of the third kind of multi-lamp driving circuit according to the first embodiment of the invention.

Referring to FIG. 7, a circuit diagram of the third kind of multi-lamp driving circuit according to the first embodiment of the invention is shown. A multi-lamp driving circuit 20(3) is different in the voltage/current converting circuit 230(2) from the multi-lamp driving circuit 20(1). The voltage/current converting circuit 230(2) includes transistors Q1 and Q2 and impedance Z3. The collectors of the transistors Q1 and Q2 are still coupled to the negative end of the diode D3 and positive end of the diode D4 respectively, but the emitters of the transistors Q1 and Q2 are both coupled to the first end of the impedance Z3, and the second end of the impedance Z3 and output terminal S2 are coupled to the ground voltage.

Because the transistors Q1 and Q2 of the voltage/current converting circuit 230(2) use common impedance, the number of impedance used in the voltage/current converting circuit 230(2) is smaller than that used in the voltage/current converting circuit 230(1), which further helps to reduce production cost.

Figure 8:
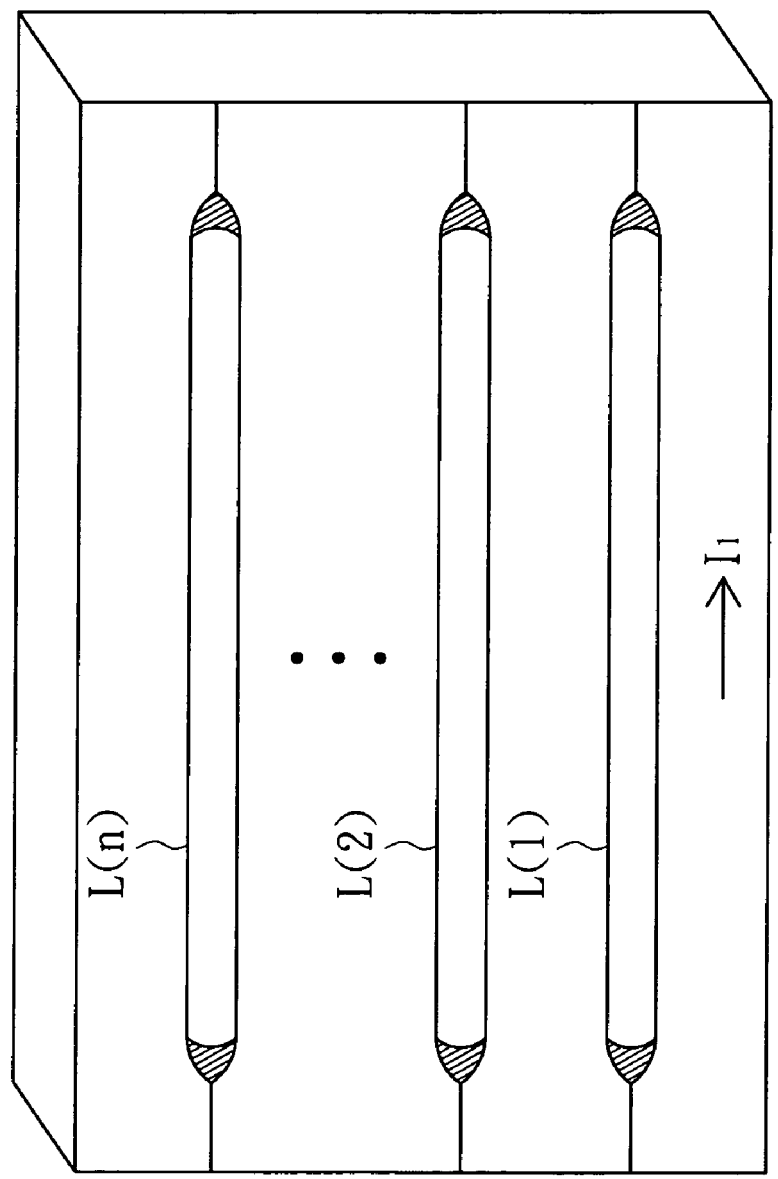
FIG. 8 is a schematic diagram of lamp arrangement in a backlight module.

Referring to FIG. 8, a schematic diagram of lamp arrangement in a backlight module is shown. Generally, due to air thermal convention, the temperature of lamps at the bottom of the backlight module is lower than that of lamps at other positions. Due to such structure limitation, the impedance of the lamp at the bottom of backlight module is larger than that of other lamps. Therefore, the lamp L(1) is preferably chosen as the lamp located at the bottom of backlight module and current of other lamps is adjusted on the basis of the current I1 of the lamp L(1).

Figure 9:
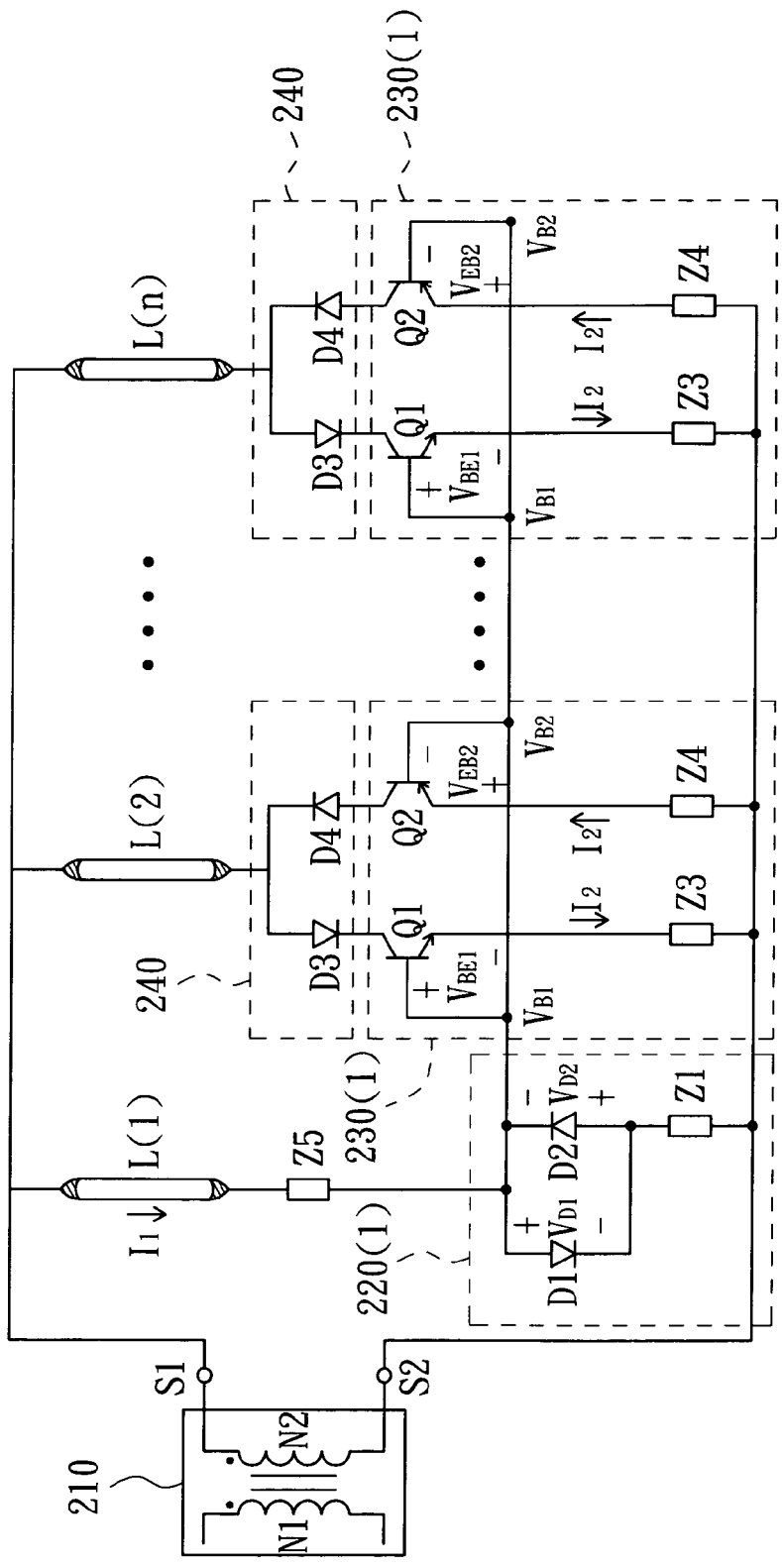
FIG. 9 is a circuit diagram of the fourth kind of multi-lamp driving circuit according to the first embodiment of the invention.

Referring to FIG. 9, a circuit diagram of the fourth kind of multi-lamp driving circuit according to the first embodiment of the invention is shown. Like the connecting configuration of the multi-lamp driving circuit 20(4), impedance Z5 is directly coupled in series to the lamp L(1) such that the resistance of the lamp L(1) and impedance Z5 is larger than that of the lamps L(2)~L(n). Then, the current of lamps L(2)~L(n) is adjusted according to the current I1 of the lamp L(1).

The multi-lamp driving circuit 20(4) uses an extra impedance Z5 coupled in series to the lamp L(1) in FIG. 3, but the invention is not limited to the driving circuit of FIG. 9. The impedance Z5 can also be coupled in series to the lamp L(1) of FIG. 6 or FIG. 7 such that the resistance of the lamp L(1) and impedance Z5 is larger than that of the lamps L(2)~L(n).

Embodiment Two

Along with market competition, in order to reduce a number of connectors, one end of the lamp is coupled to a metal structure of the backlight module for grounding. The second embodiment is provided below accompanied with FIG. 10~FIG. 14 to illustrate application of the driving circuit of the invention to such a backlight module.

Figure 10:
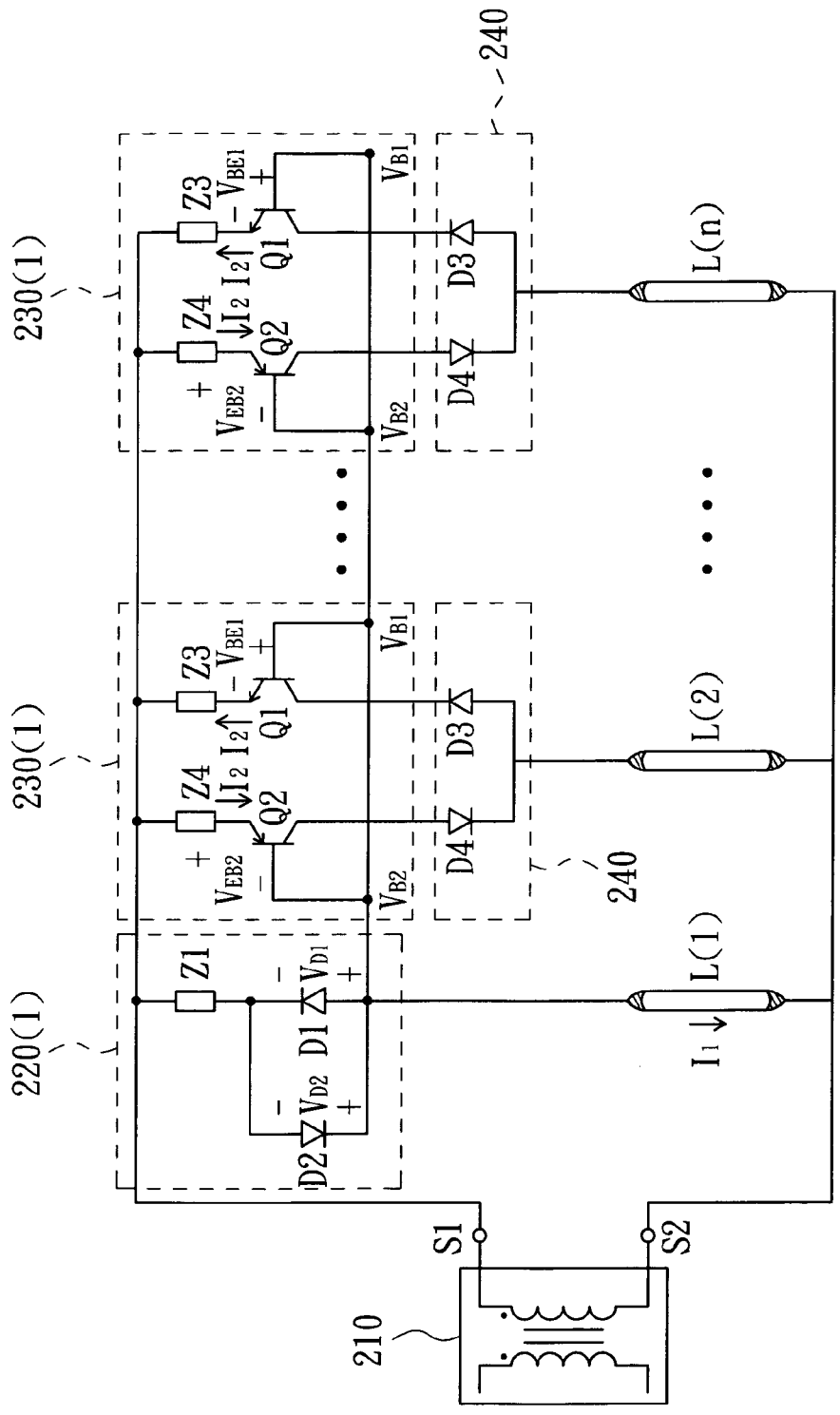
FIG. 10 is a circuit diagram of the first kind of multi-lamp driving circuit according to the second embodiment of the invention.

Referring to FIG. 10, a circuit diagram of the first kind of multi-lamp driving circuit according to the second embodiment of the invention is shown. Different from the multi-lamp driving circuit 20(1), in the multi-lamp driving circuit 20(5), the first ends of the lamps L(1)~L(n) and the output terminal S2 are coupled to the ground voltage, and the second ends of the impedance Z1, Z3 and Z4 are coupled to the output terminal S1.

Based on a similar operation principle of the multi-lamp driving circuit 20(1), when the transistor Q1 is turned on, the voltage drop across the impedance Z3 is the same as that of the impedance Z1, and when the transistor Q2 is turned on, the voltage drop across the impedance Z4 is the same as that of the impedance Z1. Therefore, the current of the lamps L(1)~L(n) is substantially the same, thereby achieving a good current balance effect.

Figure 11:
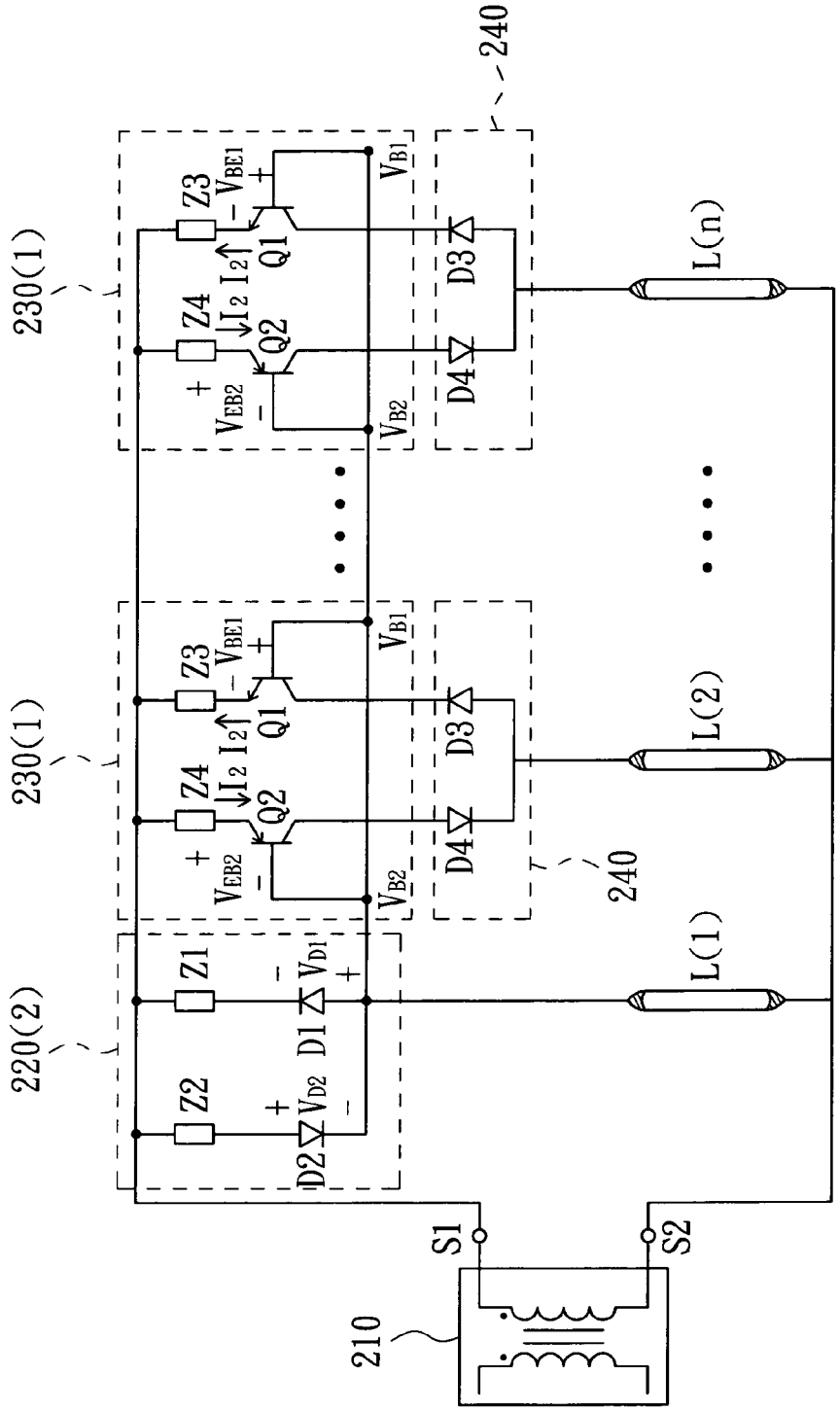
FIG. 11 is a circuit diagram of the second kind of multi-lamp driving circuit according to the second embodiment of the invention.

Referring to FIG. 11, a circuit diagram of the second kind of multi-lamp driving circuit according to the second embodiment of the invention is shown. Different from the multi-lamp driving circuit 20(2), in the multi-lamp driving circuit 20(6), the first ends of the lamps L(1)~L(n) and the output terminal S2 are coupled to the ground voltage, and the second ends of the impedance Z1~Z4 are coupled to the output terminal S1.

Based on a similar operation principle of the multi-lamp driving circuit 20(2), when the current of the lamps L(1)~L(n) is different in the positive and negative half periods, the current waveform can be improved to be equal in both the positive and negative half periods by slightly adjusting the impedance Z1 and Z2.

Figure 12:
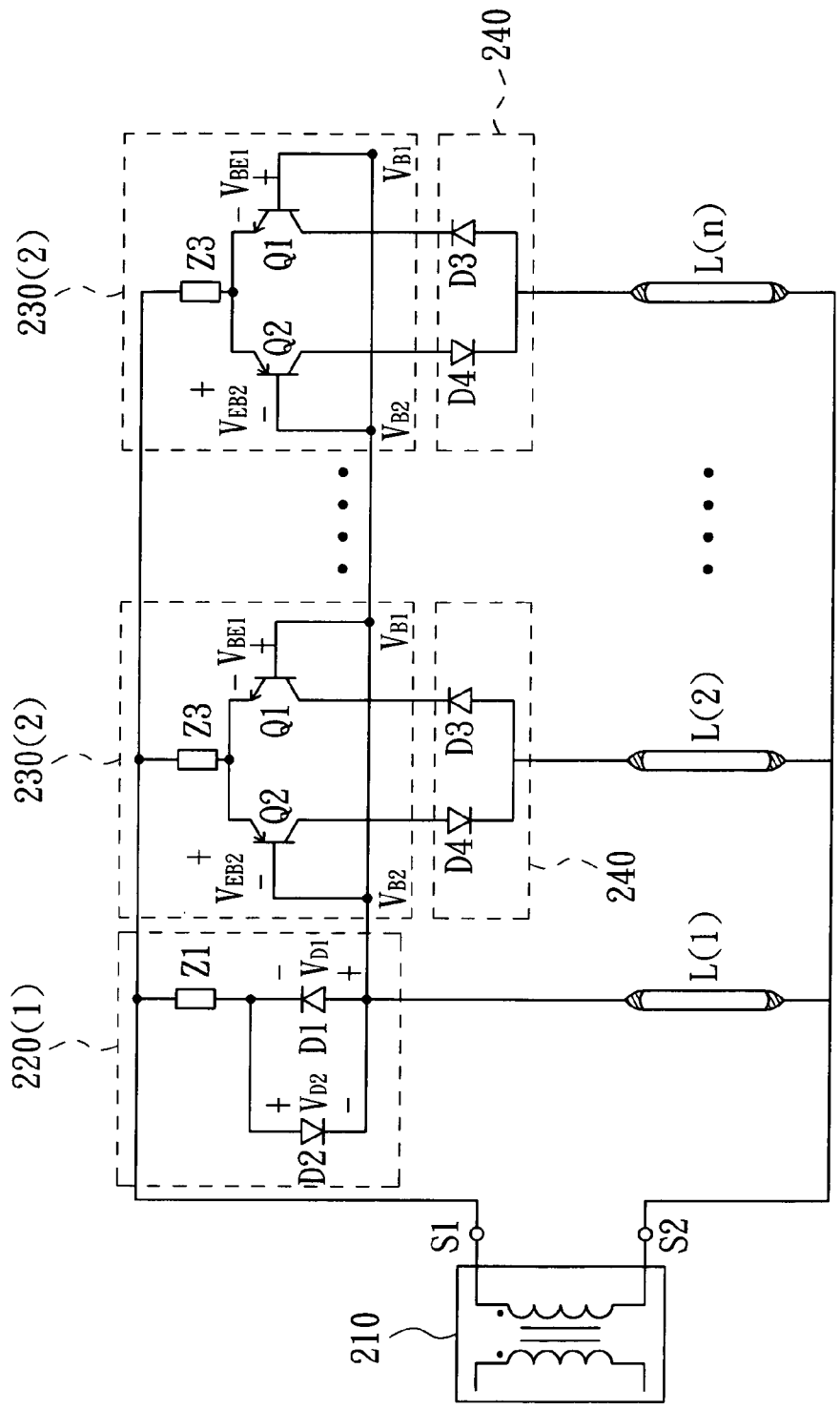
FIG. 12 is a circuit diagram of the third kind of multi-lamp driving circuit according to the second embodiment of the invention.

Referring to FIG. 12, a circuit diagram of the third kind of multi-lamp driving circuit according to the second embodiment of the invention is shown. Different from the multi-lamp driving circuit 20(3), in the multi-lamp driving circuit 20(7), the first ends of the lamps L(1)~L(n) and the output terminal S2 are coupled to the ground voltage, and the second ends of the impedance Z1 and Z3 are coupled to the output terminal S1.

Based on a similar operation principle of the multi-lamp driving circuit 20(3), because the transistors Q1 and Q2 of the voltage/current converting circuit 230(2) use the common impedance Z3, the impedance number of the voltage/current converting circuit 230(2) is smaller than that of the voltage/current converting circuit 230(1), which further reduces the production cost.

Figure 13:
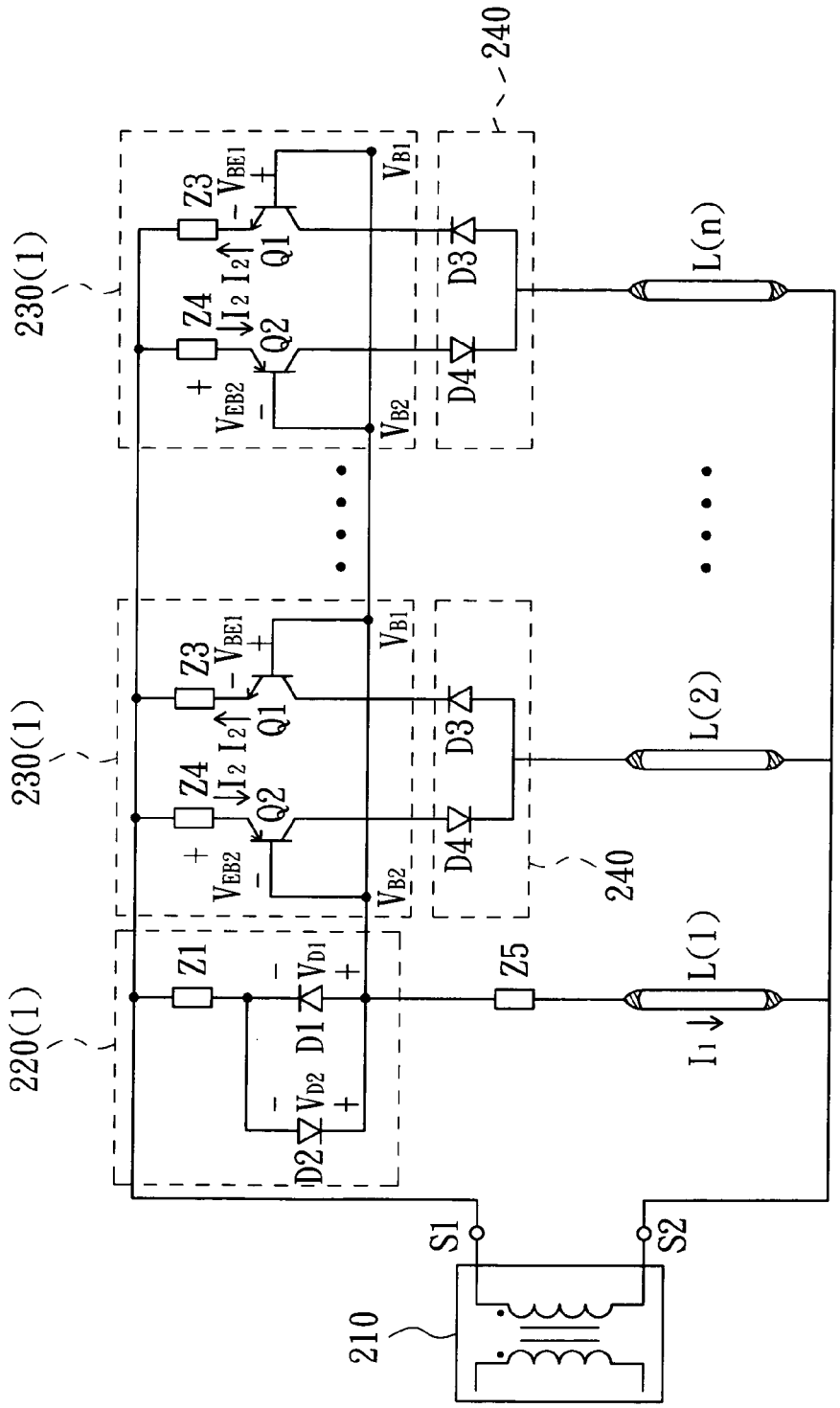
FIG. 13 is a circuit diagram of the fourth multi-lamp driving circuit according to the second embodiment of the invention.

Referring to FIG. 13, a circuit diagram of the fourth kind of multi-lamp driving circuit according to the second embodiment of the invention is shown. Different from the multi-lamp driving circuit 20(4), in the multi-lamp driving circuit 20(8), one end of each lamp L(1)~L(n) and the output terminal S2 are coupled to the ground voltage, and the other ends of the impedance Z1, Z3 and Z4 are coupled to the output terminal S1.

The multi-lamp driving circuit 20(8) uses an extra impedance Z5 coupled in series to the lamp L(1) of FIG. 10. However, the invention is not limited to the driving circuit of FIG. 13. The impedance Z5 can be also coupled in series to the lamp L(1) of FIG. 11 or FIG. 12 such that the resistance of the lamp L(1) and impedance Z5 is larger than that of the lamps L(2)~L(n).

Embodiment Three

Along with an increasing size of a display panel, the length of lamps is increased, which results in different luminance at two ends of a lamp. In order to avoid this situation, the third embodiment mentioned below accompanied with FIGS. 14~17 illustrates that the current/voltage driving circuit and voltage/current converting circuit are respectively disposed at two sides of the lamp to even luminance at two ends of the lamp.

Figure 14:
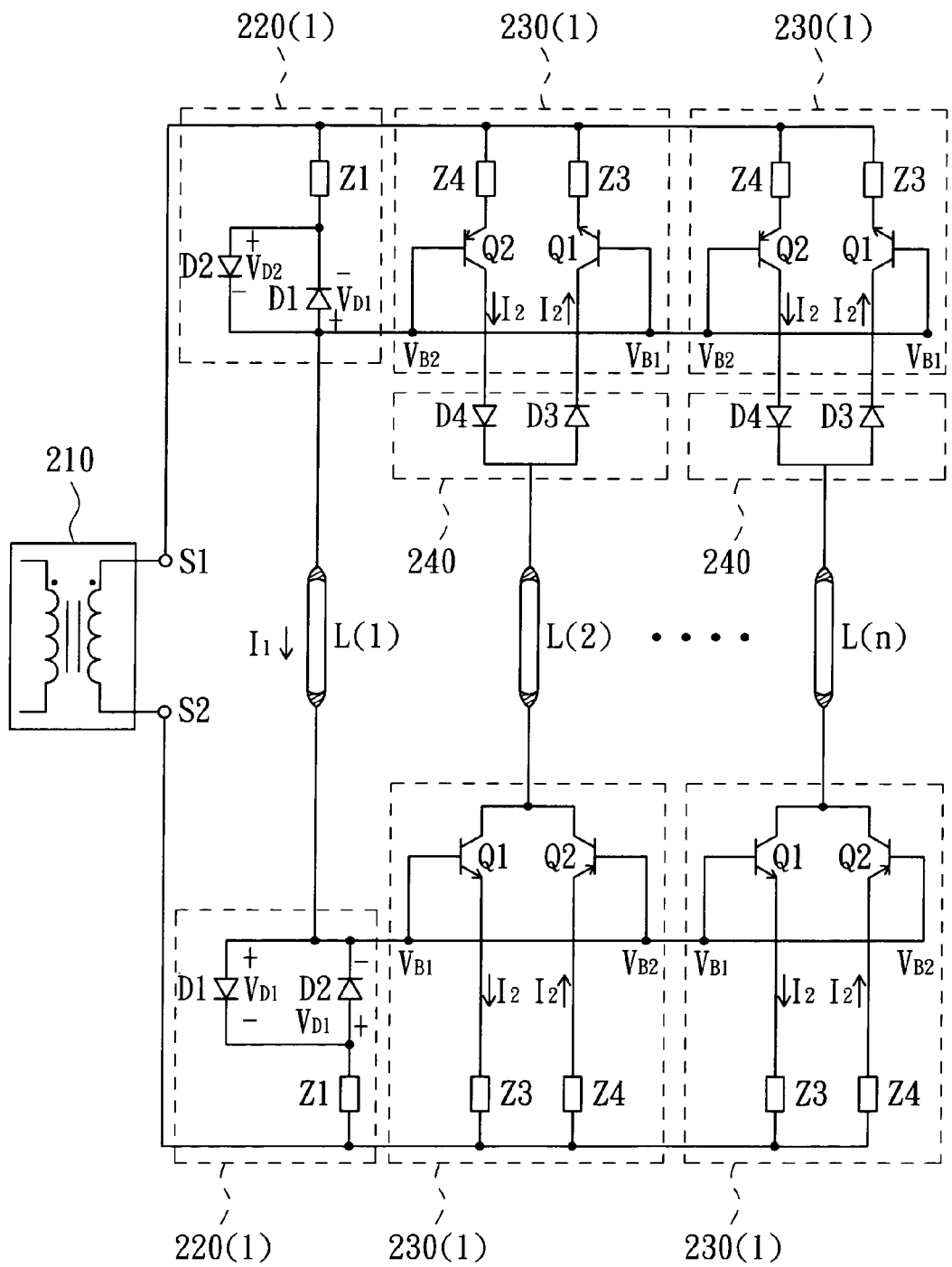
FIG. 14 a circuit diagram of the first kind of multi-lamp driving circuit according to the third embodiment of the invention.

Referring to FIG. 14, a circuit diagram of the first kind of multi-lamp driving circuit according to the third embodiment of the invention is shown. Different from the multi-lamp driving circuit 20(5), in the multi-lamp driving circuit 20(9), the current/voltage converting circuits 220(1) are disposed at two sides of the lamp L(1). The second end of the lamp L(1) is coupled to the output terminal S1 via the current/voltage converting circuit 220(1) and the first end of the lamp L(1) is coupled to the output terminal S2 via the current/voltage converting circuit 220(1). The voltage/current converting circuits 230(1) are respectively disposed at two sides of the lamps L(1)~L(n). The second ends of the lamps L(2)~L(n) are coupled to the output terminal S1 via the diode circuit 240 and voltage/current converting circuit 230(1), and the first ends of the lamps L(2)~L(n) are coupled to the output terminal S2 via the voltage/current converting circuit 230(1). The diodes, transistors and impedance of the current/voltage converting circuits 220(1), voltage/current converting circuits 230(1) and diode circuit 240 have the same connecting configuration as the above circuits, which can be seen from the figure, so any detail is not necessary to be given here.

Based a similar operation principle mentioned above, when the transistor Q1 is turned on, the voltage drop across the impedance Z3 is the same as that of the impedance Z1, and when the transistor Q2 is turned on, the voltage drop across the impedance Z4 is the same as that of the impedance Z1. Therefore, the current of the lamps L(1)~L(n) is substantially the same, thereby achieving a good current balance effect.

Figure 15:
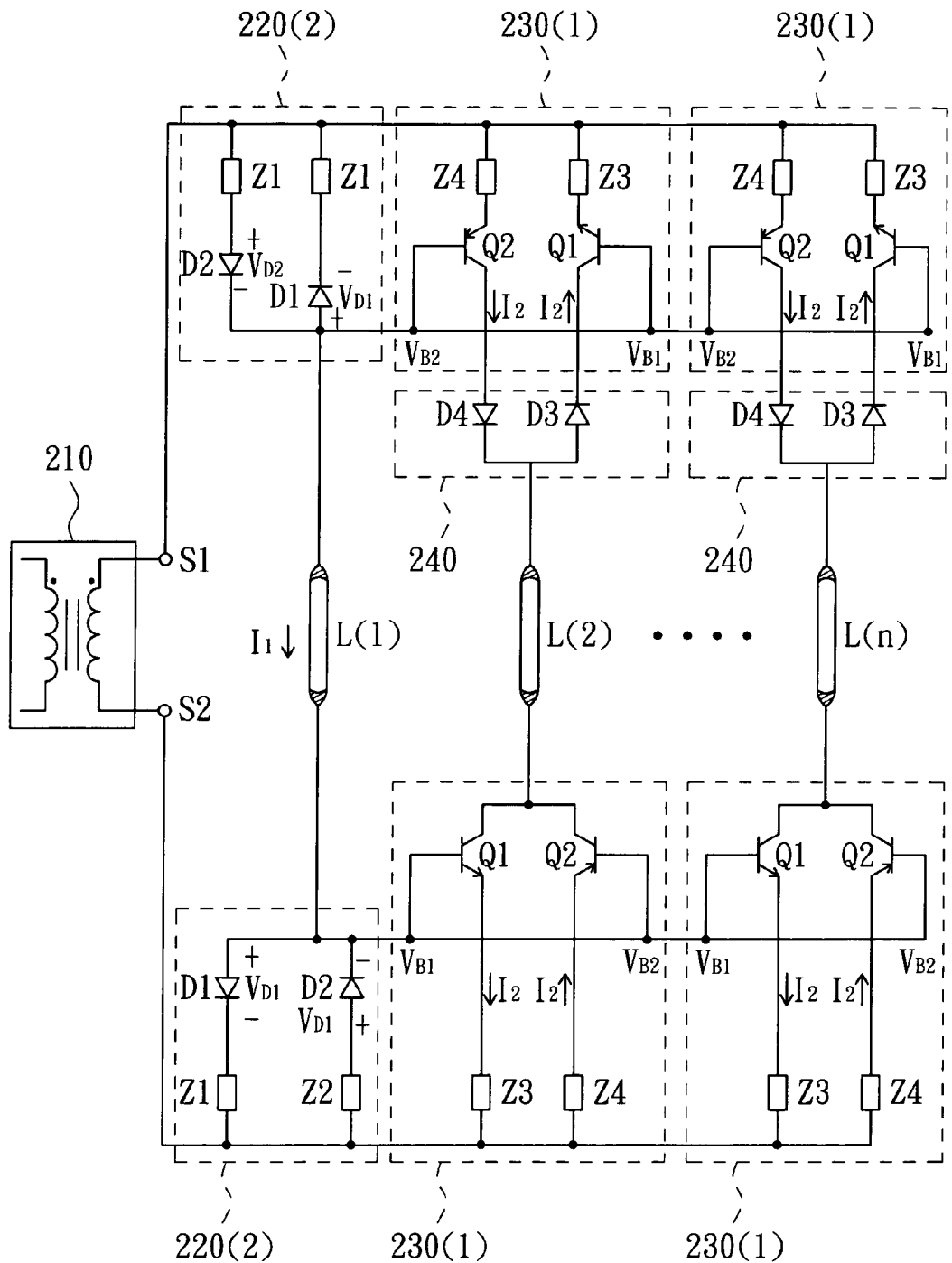
FIG. 15 is a circuit diagram of the second kind of multi-lamp driving circuit according to the third embodiment of the invention.

Referring to FIG. 15, a circuit diagram of the second kind of multi-lamp driving circuit according to the third embodiment of the invention is shown. Different from the multi-lamp driving circuit 20(6), in the multi-lamp driving circuit 20(10), the current/voltage converting circuits 220(2) are respectively disposed at two sides of the lamp L(1). The second end of the lamp L(1) is coupled to the output terminal S1 via the current/voltage converting circuit 220(2) and the first end of the lamp L(1) is coupled to the output terminal S2 via the current/voltage converting circuit 220(2). The voltage/current converting circuits 230(1) are respectively disposed at two sides of the lamps L(1)~L(n). The second ends of the lamps L(2)~L(n) are coupled to the output terminal S1 via the diode circuit 240 and voltage/current converting circuit 230(1), and the first ends of the lamps L(2)~L(n) are coupled to the output terminal S2 via the voltage/current converting circuits 230(1). The diodes, transistors and impedance of the current/voltage converting circuits 220(2), the voltage/current converting circuits 230(1) and the diode circuit 240 have the same connecting configuration as the above circuits, which can be seen from the figure, so any detail is not necessary to be given here.

Based on a similar operation principle of the multi-lamp driving circuit 20(6), when the current of the lamps L(1)~L(n) is different in positive and negative half periods, the current waveform can be improved to be equal in both the positive and negative half periods by slightly adjusting the impedance Z1 and Z2.

Figure 16:
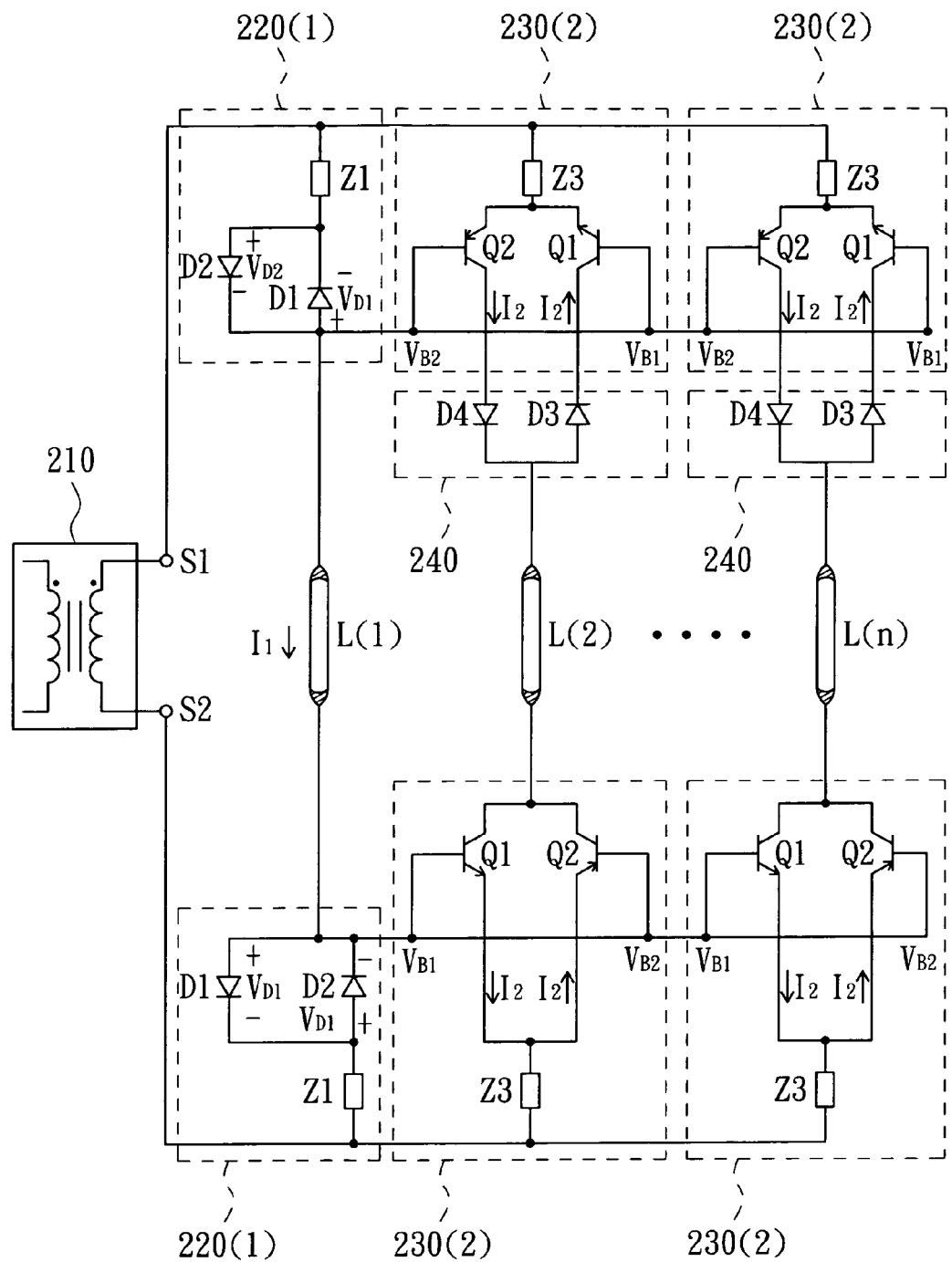
FIG. 16 is a circuit diagram of the third kind of multi-lamp driving circuit according to the third embodiment of the invention.

Referring to FIG. 16, a circuit diagram of the third kind of multi-lamp driving circuit according to the third embodiment of the invention is shown. Different from the multi-lamp driving circuit 20(7), in the multi-lamp driving circuit 20(11), the current/voltage converting circuits 220(1) are respectively disposed at two sides of the lamp L(1). The second end of the lamp L(1) is coupled to the output terminal S1 via the current/voltage converting circuit 220(1) and the first end of the lamp L(1) is coupled to the output terminal S2 via the current/voltage converting circuit 220(1). The voltage/current converting circuits 230(2) are respectively disposed at two sides of the lamps L(1)~L(n). The second ends of the lamps L(2)~L(n) are coupled to the output terminal S1 via the diode circuit 240 and voltage/current converting circuit 230(2), and the first ends of the lamps L(2)~L(n) are coupled to the output terminal S2 via the voltage/current converting circuits 230(2). The diodes, transistors and impedance of the current/voltage converting circuits 220(1), the voltage/current converting circuits 230(1) and the diode circuit 240 have the same connecting configuration as the above circuits, which can be seen from the figure, so any detail is not necessary to be given here.

Based on a similar operation principle of the multi-lamp driving circuit 20(7), because the transistors Q1 and Q2 of the voltage/current converting circuit 230(2) use the common impedance Z3, the impedance number of the voltage/current converting circuit 230(2) is smaller than that of the voltage/current converting circuit 230(1), which further reduces the production cost.

Figure 17:
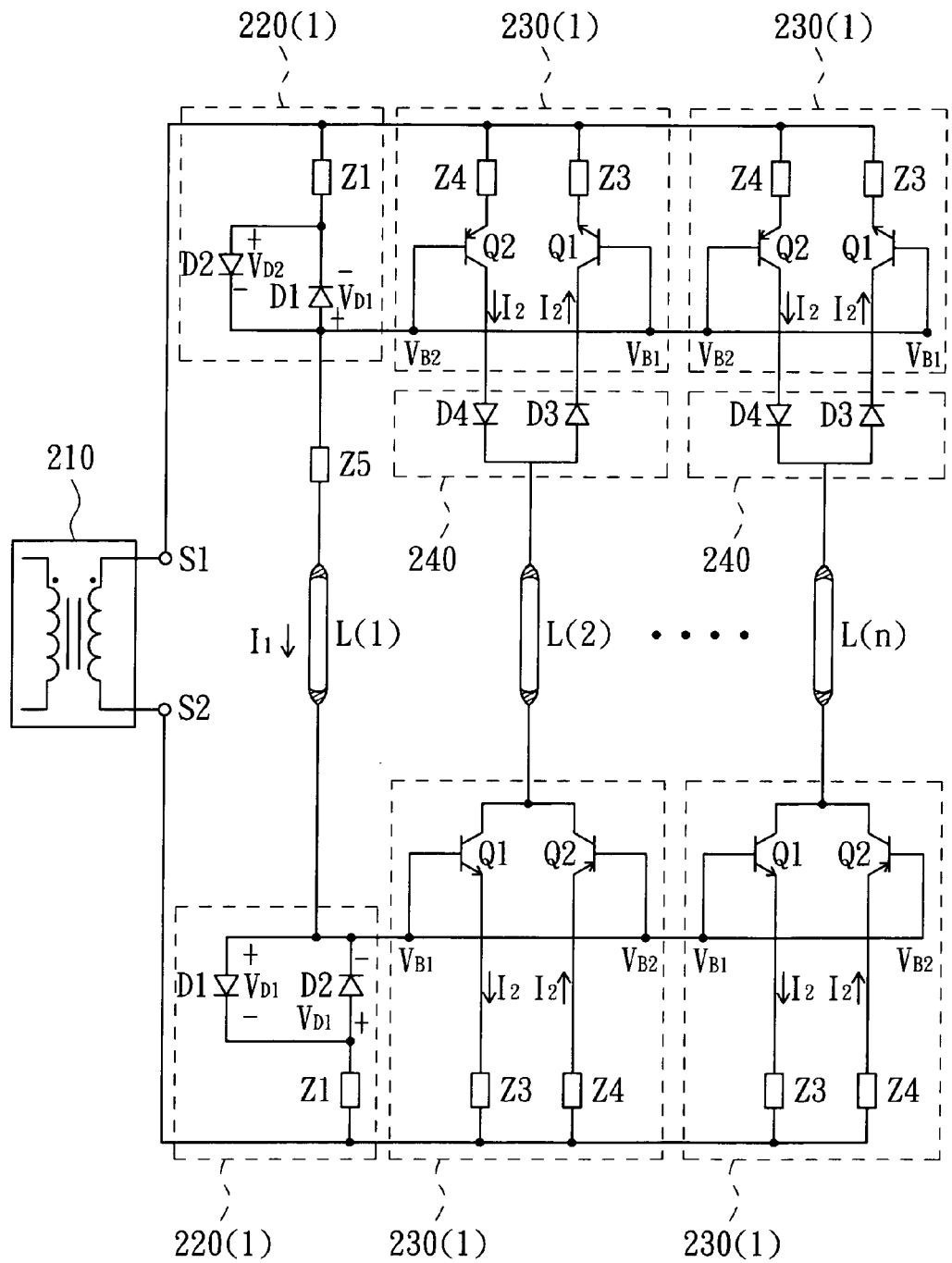
FIG. 17 is a circuit diagram of the fourth kind of multi-lamp driving circuit according to the third embodiment of the invention.

Referring to FIG. 17, a circuit diagram of the fourth kind of multi-lamp driving circuit according to the third embodiment of the invention is shown. Different from the multi-lamp driving circuit 20(8), in the multi-lamp driving circuit 20(12), the current/voltage converting circuits 220(1) are respectively disposed at two sides of the lamp L(1). The second end of the lamp L(1) is coupled to the output terminal S1 via the current/voltage converting circuit 220(1) and the first end of the lamp L(1) is coupled to the output terminal S2 via the current/voltage converting circuit 220(1). The voltage/current converting circuits 230(1) are respectively disposed at two sides of the lamps L(1)~L(n). The second ends of the lamps L(2)~L(n) are coupled to the output terminal S1 via the diode circuit 240 and voltage/current converting circuit 230(1), and the first ends of the lamps L(2)~L(n) are coupled to the output terminal S2 via the voltage/current converting circuits 230(1). The diodes, transistors and impedance of the current/voltage converting circuits 220(1), voltage/current converting circuits 230(1) and diode circuit 240 have the same connecting configuration as the above circuits, which can be seen from the figure, so any detail is not necessary to be given here.

The multi-lamp driving circuit 20(12) uses an extra impedance Z5 coupled in series to the lamp L(1) of FIG. 14. However, the invention is not limited to the driving circuit of FIG. 17. The impedance Z5 can be also coupled in series to the lamp L(1) of FIG. 15 or FIG. 16 such that the resistance of the lamp L(1) and impedance Z5 is larger than that of the lamps L(2)~L(n).

The above-mentioned first, second and third embodiments use a transformer together with the current/voltage converting circuit and voltage/current converting circuit to balance the current in each lamp. Because the current in each lamp is substantially the same, the luminance distribution of the backlight module can be better uniformed. Besides, the multi-lamp driving circuit of the invention only needs a transformer to drive a number of lamps, which reduces the number of transformers to be used. Therefore, production cost for the driving circuit can be reduced to increase market competitiveness.

The multi-lamp driving circuit disclosed in the above-mentioned embodiments of the invention can balance the current of each lamp by using a current/voltage converting circuit and a voltage/current converting circuit. Owing that the current/voltage converting circuit and voltage/current converting circuit are composed of resistors, diodes and transistors, the production cost for the driving circuit can be greatly reduced. In addition, the above-mentioned resistors, diodes and transistors can be integrated in a chip to increase the available area of a PCB.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A multi-lamp driving circuit, comprising:
   a transformer, comprising a secondary coil having a first output terminal and a second output terminal;
   a first lamp and a second lamp, each of the first lamp and the second lamp having one end coupled to the first output terminal; and
   a current/voltage converting circuit, for outputting a voltage according to a first current of the first lamp; and
   a voltage/current converting circuit, for correspondingly generating a second current according to the voltage, wherein the second current is substantially equal to current of the second lamp.

2. The multi-lamp driving circuit according to claim 1, wherein the first lamp has the other end coupled to the second output terminal via the voltage/current converting circuit.

3. The multi-lamp driving circuit according to claim 2, wherein the current/voltage converting circuit comprises:
   a first diode and a second diode, wherein a positive end of the first diode and a negative end of the second diode are coupled to the other end of the first lamp; and
   a first impedance, having one end coupled to a negative end of the first diode and a positive end of the second diode, and the other end coupled to the second output terminal.

4. The multi-lamp driving circuit according to claim 3, further comprising a diode circuit, wherein the other end of the second lamp is coupled to the second output terminal via the voltage/current converting circuit and diode circuit.

5. The multi-lamp driving circuit according to claim 4, wherein the diode circuit further comprises:
   a third diode, having a positive end coupled to the other end of the second lamp;
   a fourth diode, having a negative end coupled to the other end of the second lamp.

6. The multi-lamp driving circuit according to claim 5, wherein the diode circuit is coupled to the second output terminal via the voltage/current converting circuit.

7. The multi-lamp driving circuit according to claim 6, wherein the voltage/current converting circuit comprises:
   a first transistor, having a first end, a second end and a first control terminal, the second end coupled to a negative end of the third diode, the first control terminal coupled to the other end of the first lamp;
   a second transistor, having a third end, a fourth end and a second control terminal, the fourth end coupled to a positive end of the fourth diode, the second control terminal coupled to the other end of the first lamp;
   a third impedance, having one end coupled to the first end and the other end coupled to the second output terminal, wherein the third impedance is substantially equal to the first impedance; and
   a fourth impedance, having one end coupled to the third end and the other end coupled to the second output terminal, wherein the fourth impedance is substantially equal to the first impedance;
   wherein the first transistor is a NPN-type transistor and the second transistor is a PNP-type transistor.

8. The multi-lamp driving circuit according to claim 7, wherein the second output terminal is coupled to a ground voltage.

9. The multi-lamp driving circuit according to claim 7, wherein the first output terminal is coupled to a ground voltage.

10. The multi-lamp driving circuit according to claim 6, wherein the voltage/current converting circuit comprises:
    a first transistor, having a first end, a second end and a first control terminal, the second end coupled to a negative end of the third diode, the first control terminal coupled to the other end of the first lamp;
    a second transistor, having a third end, a fourth end and a second control terminal, the fourth end coupled to a positive end of the fourth diode, the second control terminal coupled to the other end of the first lamp;
    a third impedance, having one end coupled to the first end and the third end, and the other end coupled to the second output terminal, wherein the third impedance is substantially equal to the first impedance;
    wherein the first transistor is a NPN-type transistor and the second transistor is a PNP-type transistor.

11. The multi-lamp driving circuit according to claim 2, wherein the current/voltage converting circuit comprises:
    a first diode and a second diode, wherein a positive end of the first diode and a negative end of the second diode are coupled to the other end of the first lamp; and
    a first impedance, having one end coupled to a negative end of the first diode and the other end couple to the second output terminal; and
    a second impedance, having one end coupled to a positive end of the second diode and the other end coupled to the second output terminal.

12. The multi-lamp driving circuit according to claim 1, further comprising fifth impedance, coupled to the first lamp in series.

13. A multi-lamp driving circuit, comprising:
    a transformer, comprising a secondary coil having a first output terminal and a second output terminal;
    a first lamp and a second lamp;
    a first current/voltage converting circuit, wherein one end of the first lamp is coupled to the first output terminal via the first current/voltage converting circuit;
    a second current/voltage converting circuit, wherein the other end of the first lamp is coupled to the second output terminal via the second current/voltage converting circuit;
    a first voltage/current converting circuit, wherein one end of the second lamp is coupled to the first output terminal via the first voltage/current converting circuit;
    a second voltage/current converting circuit, wherein the other end of the second lamp is coupled to the second output terminal via the second voltage/current converting circuit;
    wherein each of the first current/voltage converting circuit and the second current/voltage converting circuit outputs a voltage according to a first current of the first lamp, each of the first voltage/current converting circuit and the second voltage/current converting circuit correspondingly generates a second current according to the voltage, and the second current is substantially equal to the current of the second lamp.

14. The multi-lamp driving circuit according to claim 13, wherein the first current/voltage converting circuit comprises:
   a first diode and a second diode, wherein a positive end of the first diode and a negative end of the second diode are coupled to one end of the first lamp; and
   a first impedance, having one end coupled to a negative end of the first diode and a positive end of the second diode, and the other end coupled to the first output terminal.

15. The multi-lamp driving circuit according to claim 14, wherein the second current/voltage converting circuit comprises:
   a third diode and a fourth diode, wherein a positive end of the third diode and a negative end of the fourth diode are coupled to the other end of the first lamp; and
   a third impedance, having one end coupled to a negative end of the third diode and a positive end of the fourth diode and the other end coupled to the second output terminal, wherein the third impedance is substantially equal to the first impedance.

16. The multi-lamp driving circuit according to claim 15, further comprising a diode circuit, wherein the other end of the second lamp is coupled to the second output terminal via the second voltage/current converting circuit and the diode circuit.

17. The multi-lamp driving circuit according to claim 16, wherein the diode circuit further comprises:
   a fifth diode, having a positive end coupled to the other end of the second lamp;
   a sixth diode, having a negative end coupled to the other end of the second lamp.

18. The multi-lamp driving circuit according to claim 17, wherein the diode circuit is coupled to the second output terminal via the second voltage/current converting circuit.

19. The multi-lamp driving circuit according to claim 18, wherein the first voltage/current converting circuit comprises:
   a first transistor, having a first end, a second end and a first control terminal, the second end coupled to a negative end of the fifth diode, the first control terminal coupled to the other end of the first lamp;
   a second transistor, having a third end, a fourth end and a second control terminal, the fourth end coupled to a positive end of the sixth diode, the second control terminal coupled to the other end of the first lamp;
   a fifth impedance, having one end coupled to the first end, and the other end coupled to the first output terminal, wherein the fifth impedance is substantially equal to the first impedance; and
   a sixth impedance, having one end coupled to the third end, and the other end coupled to the first output terminal, wherein the sixth impedance is substantially equal to the first impedance.

20. The multi-lamp driving circuit according to claim 19, wherein the second voltage/current converting circuit comprises:
   a third transistor, having a fifth end, a sixth end and a third control terminal, the sixth end coupled to the other end of the second lamp, the third control terminal coupled to the other end of the first lamp;
   a fourth transistor, having a seventh end, a eighth end and a fourth control terminal, the eighth end coupled to the other end of the second lamp, the fourth control terminal coupled to the other end of the first lamp;
   a seventh impedance, having one end coupled to the fifth end, and the other end coupled to the second output terminal, wherein the seventh impedance is substantially equal to the first impedance;
   a eighth impedance, having one end coupled to the seventh end, and the other end coupled to the second output terminal, wherein the eighth impedance is substantially equal to the first impedance.

21. The multi-lamp driving circuit according to claim 18, wherein the first voltage/current converting circuit comprises:
   a first transistor, having a first end, a second end and a first control terminal, the second end coupled to a negative end of the fifth diode, the first control terminal coupled to the other end of the first lamp;
   a second transistor, having a third end, a fourth end and a second control terminal, the fourth end coupled to a positive end of the sixth diode, the second control terminal coupled to the other end of the first lamp;
   a fifth impedance, having one end coupled to the first end and the third end, wherein the fifth impedance is substantially equal to the first impedance.

22. The multi-lamp driving circuit according to claim 19, wherein the second voltage/current converting circuit comprises:
   a third transistor, having a fifth end, a sixth end and a third control terminal, the sixth end coupled to the other end of the second lamp, the third control terminal coupled to the other end of the first lamp;
   a fourth transistor, having a seventh end, an eighth end and a fourth control terminal, the eighth end coupled to the other end of the second lamp, the fourth control terminal coupled to the other end of the first lamp;
   a seventh impedance, having one end coupled to the fifth end and the seventh end, wherein the seventh impedance is substantially equal to the first impedance.

23. The multi-lamp driving circuit according to claim 13, wherein the first current/voltage converting circuit comprises:
   a first diode and a second diode, wherein a positive end of the first diode and a negative end of the second diode are coupled to one end of the first lamp; and
   a first impedance, having one end coupled to a negative end of the first diode and the other end couple to the first output terminal; and
   a second impedance, having one end coupled to a positive end of the second diode and the other end coupled to the first output terminal.

24. The multi-lamp driving circuit according to claim 21, wherein the second current/voltage converting circuit comprises:
   a third diode and a fourth diode, wherein a positive end of the third diode and a negative end of the fourth diode are coupled to the other end of the first lamp; and
   a third impedance, having one end coupled to a negative end of the third diode and the other end couple to the second output terminal; and
   a fourth impedance, having one end coupled to a positive end of the fourth diode and the other end coupled to the second output terminal.

* * * * *